US011784912B2

United States Patent
Ehrat et al.

(10) Patent No.: US 11,784,912 B2
(45) Date of Patent: Oct. 10, 2023

(54) INTELLIGENTLY ROUTING INTERNET TRAFFIC

(71) Applicant: CLOUDFLARE, INC., San Francisco, CA (US)

(72) Inventors: Braden Ehrat, Champaign, IL (US); Jay A. Kreibich, San Francisco, CA (US); Jérôme Fleury, San Francisco, CA (US); Michael Vanderwater, Champaign, IL (US); Nicholas Alexander Wondra, Savoy, IL (US); Richard Thompson, Sydney (AU)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 15/930,999

(22) Filed: May 13, 2020

(65) Prior Publication Data

US 2020/0366592 A1 Nov. 19, 2020

Related U.S. Application Data

(60) Provisional application No. 62/847,307, filed on May 13, 2019.

(51) Int. Cl.
*H04L 12/721* (2013.01)
*H04L 29/12* (2006.01)
(Continued)

(52) U.S. Cl.
CPC .............. *H04L 45/14* (2013.01); *H04L 45/44* (2013.01); *H04L 61/5007* (2022.05)

(58) Field of Classification Search
CPC ...... H04L 45/14; H04L 45/44; H04L 61/2007
(Continued)

(56) References Cited

U.S. PATENT DOCUMENTS

| 7,254,634 B1 | 8/2007 | Davis et al. |
| 7,260,645 B2 * | 8/2007 | Bays .................... H04L 41/0253 709/224 |

(Continued)

FOREIGN PATENT DOCUMENTS

WO  WO-2008006041 A2 *  1/2008  ......... H04L 61/2092

OTHER PUBLICATIONS

Rustam Lalkaka, Introducing Argo—A faster, more reliable, more secure Internet for everyone, May 18, 2017 downloaded at: https://blog.cloudflare.com/argo/, 17 pages.

(Continued)

*Primary Examiner* — Zi Ye
(74) *Attorney, Agent, or Firm* — NICHOLSON DE VOS WEBSTER & ELLIOTT LLP

(57) ABSTRACT

A request from a client device is received at a first one of a plurality of compute nodes at a first one of a plurality of data centers of a distributed cloud computing network. A destination of the request is determined. An optimized route for transmitting the request toward an origin server that corresponds with the destination of the request is determined, where the optimized route is based on at least in part on probe data between data centers of the distributed cloud computing network for a plurality of transit connections, and where the optimized route has an IP address that encodes an identification of which of the plurality of transit connections is to be used to deliver the request. The request is transmitted to a next hop as defined by the optimized route over the identified one of the plurality of transit connections.

21 Claims, 6 Drawing Sheets

(51) Int. Cl.
*H04L 45/00* (2022.01)
*H04L 45/44* (2022.01)
*H04L 61/5007* (2022.01)

(58) Field of Classification Search
USPC .......................................................... 709/238
See application file for complete search history.

(56) References Cited

U.S. PATENT DOCUMENTS

| | | | |
|---|---|---|---|
| 7,953,888 | B2 | 5/2011 | Ricciulli |
| 8,699,349 | B2 | 4/2014 | Rajpathak |
| 8,819,187 | B1 | 8/2014 | Hofmann |
| 8,891,522 | B2 | 11/2014 | Fletcher et al. |
| 9,246,712 | B2 | 1/2016 | Damola |
| 9,253,545 | B2 | 2/2016 | Lemmons |
| 9,419,845 | B2 | 8/2016 | Wainner et al. |
| 9,736,710 | B2 | 8/2017 | Kim et al. |
| 9,807,004 | B2 | 10/2017 | Koley et al. |
| 10,298,601 | B2 | 5/2019 | Graham-Cumming |
| 10,374,953 | B1 | 8/2019 | Branch et al. |
| 10,659,256 | B2 | 5/2020 | Oré et al. |
| 10,687,188 | B2 | 6/2020 | Kim et al. |
| 11,115,480 | B2 | 9/2021 | Markuze et al. |
| 2002/0161924 | A1* | 10/2002 | Perrin .................... H04L 45/00 709/240 |
| 2002/0165957 | A1* | 11/2002 | Devoe .................... H04L 43/50 709/224 |
| 2008/0008089 | A1* | 1/2008 | Bornstein ............... H04L 29/06 370/227 |
| 2013/0205025 | A1 | 8/2013 | Shamsee et al. |
| 2017/0063573 | A1* | 3/2017 | Maskalik ............ G06F 9/45558 |
| 2017/0195161 | A1 | 7/2017 | Ruel et al. |
| 2019/0238449 | A1 | 8/2019 | Michael et al. |

OTHER PUBLICATIONS

Fielding et al., Hypertext Transfer Protocol—HTTP/1.1, Network Working Group, Request for Comments: 2616, Jun. 1999, 114 pages.

Akella et al., A Comparison of Overlay Routing and Multihoming Route Control, SIGCOMM'04, Aug. 30-Sep. 3, 2004, 14 pages.

Nygren, Erik et al. "The Akamai network: a platform for high-performance internet applications." ACM SIGOPS Oper. Syst. Rev. 44 (2010): 2-19.

Ahmed, Faraz et al., "Optimizing Internet Transit Routing for Content Delivery Networks", IEEE/ACM Transactions On Networking, vol. 26, No. 1, Feb. 2018, pp. 76-89.

* cited by examiner

INTELLIGENTLY ROUTING INTERNET TRAFFIC

CROSS-REFERENCE TO RELATED APPLICATIONS

This application claims the benefit of U.S. Provisional Application No. 62/847,307, filed May 13, 2019, which is hereby incorporated by reference.

FIELD

Embodiments of the invention relate to the field of computing; and more specifically, to intelligently routing internet traffic.

BACKGROUND

Global internet routing is configured by advertising network prefixes. These prefixes define a group of IP addresses that a network device is willing to route. Many data centers are serviced by multiple network providers. Conventionally a data center or network advertises all its prefixes on all its links, indicating that any connecting network can send data addressed to those IP addresses to that location. Conventional internet routing typically picks one path for traffic between data centers, largely based off common providers. This pathing, while simple and predictable, is not always optimal.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A method and apparatus for intelligently routing internet traffic is described. The internet traffic is routed through multiple compute nodes of a distributed network. The compute nodes are geographically distributed (e.g., in different locations throughout the world). There may be hundreds to thousands of compute nodes of the distributed network. The intelligent routing of traffic includes calculating one or more optimized routes based on a set of factors such as latency, speed, reliability, and/or cost; for each combination of network providers (e.g., Internet Service Providers). The optimized routes may or may not be the same as the route taken by conventional routing protocols such as standard BGP. In an embodiment, the intelligent routing is based on network probe data to calculate the routes to take to the destination.

There may be multiple network connections from multiple transit providers that connect a first compute node and a second compute node. The intelligent routing includes selecting a transit provider from multiple transit providers to carry the traffic between one compute node to another compute node. Four variables exist for a single connection between a first compute node and a second compute node: egress from the first compute node, ingress to the second compute node, egress from the second compute node, and ingress to the first compute node. In an embodiment, each of these four variables is tested for each combination of transit providers on both sides of the connection. The resulting data is then used to calculate forwarding tables that provide optimized routes.

The optimized routes use encoded IP addresses that encode the transit provider information used by the network connections. These encoded IP addresses are sometimes referred herein as transit selection IP addresses. The transit selection IP addresses define the endpoints (e.g., source and destination compute nodes) and also the transit providers that are to be used to move traffic. The choice of source and destination transit selection IP addresses may be made by programs or applications running on the compute nodes. This allows the programs or applications to select individual routing policies and route decisions on a case-by-case, packet-by-packet, and/or connection-by-connection basis. A particular compute node may be assigned a unique IP address for each of the multiple network connections. Each particular IP address encodes an identifier of the link and an identifier of the machine.

The compute node can instruct an edge device (e.g., router, switch) regarding how the traffic is to be handled, e.g., through the transit selection IP addresses. The edge devices are configured to recognize the transit selection IP addresses and perform specific traffic routing behavior depending on the encoding of the transit selection IP addresses.

Figure 1:
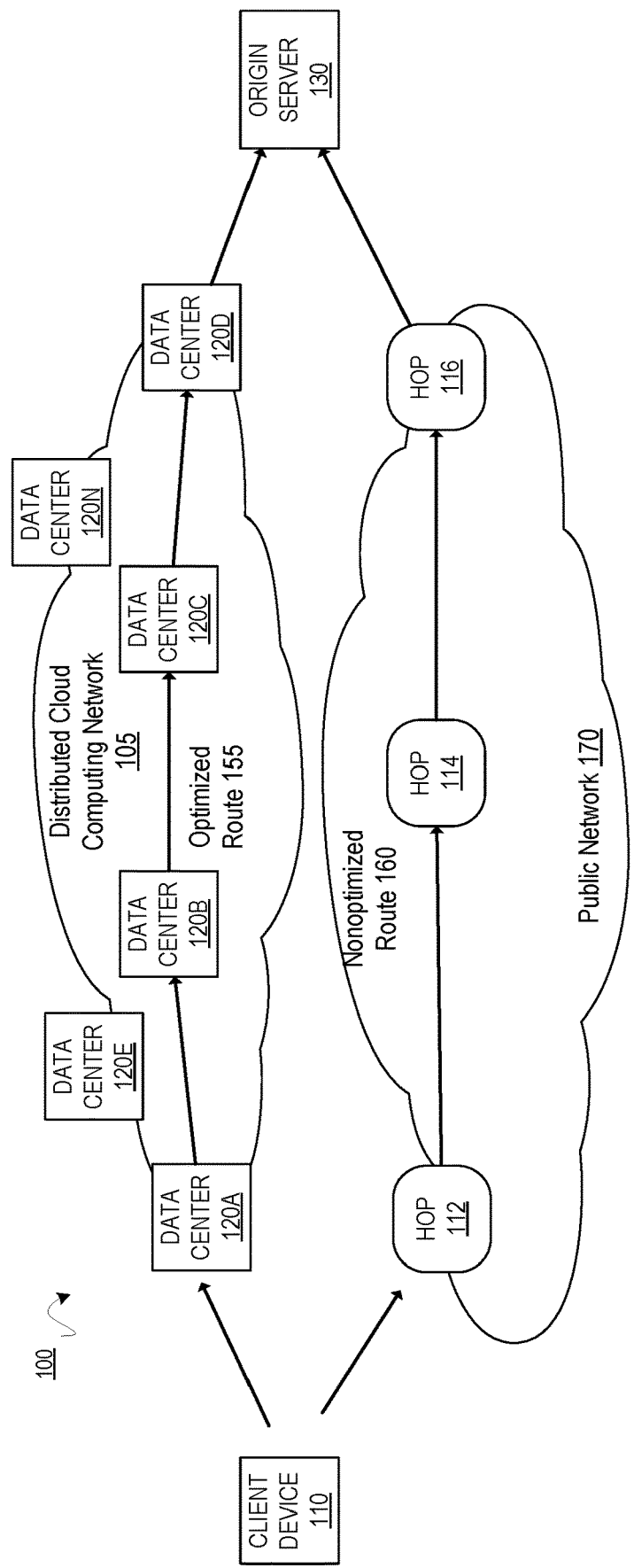
FIG. 1 illustrates an exemplary system for intelligently routing internet traffic according to an embodiment.

FIG. 1 illustrates an exemplary system for intelligently routing Internet traffic according to an embodiment. The system 100 includes the client device 110, the data centers 120A-N, and the origin server 130. The client device 110 is a computing device (e.g., laptop, workstation, smartphone, palm top, mobile phone, tablets, gaming system, set-top box, etc.) that is capable of accessing network resources through a client network application (e.g., a browser, a mobile application, or other network application).

Each data center 120 includes one or more compute nodes of a distributed cloud computing network 105. Each compute node is a computing device that may provide multiple services for customers (e.g., domain owners). The data centers 120A-N are geographically distributed (e.g., in different locations throughout the world). There may be hundreds to thousands of data centers. The data centers 120A-N process web traffic (e.g., HTTP/S requests/responses, SPDY requests/responses, or other web traffic), and may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), TCP stack optimizations, and/or other services. Each data center may include one or more physical servers (e.g., one or more compute servers, one or more control servers, one or more DNS servers (e.g., one or more authoritative name servers, one or more proxy DNS servers), and one or more other pieces of network equipment such as router(s), switch(es), and/or hubs.

Each data center 120 may operate as a reverse proxy and receive requests for network resources (e.g., HTTP/S requests) of a domain of the origin server 130. The particular data center 120 that receives a request from a client device may be determined by the network infrastructure according to an Anycast implementation or by a geographical load balancer. For instance, compute nodes within the data centers 120A-N may have a same anycast IP address that points to a domain of the origin server 130. If the origin server 130 handles the domain "example.com", a DNS request for "example.com" returns an address record having the anycast IP address of the compute nodes within the data centers 120A-N. Which of the data centers 120A-N receives a request from a client device depends on which data center 120 is closest to the client device in terms of routing protocol configuration (e.g., Border Gateway Protocol (BGP) configuration) according to an anycast implementation as determined by the network infrastructure (e.g., router(s), switch(es), and/or other network equipment between the requesting client and the data centers 120A-N). As illustrated in FIG. 1, the client device 110 is closest to the data center 120A. Accordingly, requests from the client device 110 are received at the data center 120A. In some embodiments, instead of using an anycast mechanism, a geographical load balancer is used to route traffic to the nearest data center. The number of client devices and compute servers illustrated in FIG. 1 is exemplary. The distributed cloud computing network may include hundreds to thousands (or more) data centers and each data center may receive requests from thousands or more client devices.

Traffic may traverse the internet between data centers 120A-N. There may be multiple network providers that provide transit connections between the data centers 120A-N. The different transit connections may have different properties (e.g., different performance characteristics such as latency, speed, and/or reliability; and cost). An optimized route between the entry data center and the exit data center may be determined and used. The entry data center is the data center that initially receives the traffic and the exit data center is the data center that is connected to the origin server. For instance, with respect to FIG. 1, the data center 120A is the entry data center and the data center 120D is the exit data center. The optimized route may be based on a set of factors such as latency, speed, reliability, and/or cost, for each of the transit connections. The optimized route may not be the same as the route taken by conventional routing protocols such as standard BGP. For instance, FIG. 1 illustrates the optimized route 155 that goes from the data center 120A to the data center 120B to the data center 120C to the data center 120D to the origin server 130. The data centers 120E-120N are not part of the optimized route 155. FIG. 1 also illustrates a nonoptimized route 160 going through the hops (internet nodes) 112 to 114 to 116 of a public network 170 (e.g., the general internet) to the origin server 130. This nonoptimized route does not take network conditions into account but rather is based on a conventional routing protocol such as BGP. The optimized route 155, when compared to the nonoptimized route 160, may have lower latency, higher speed, more reliability, and/or lower cost.

Figure 2:
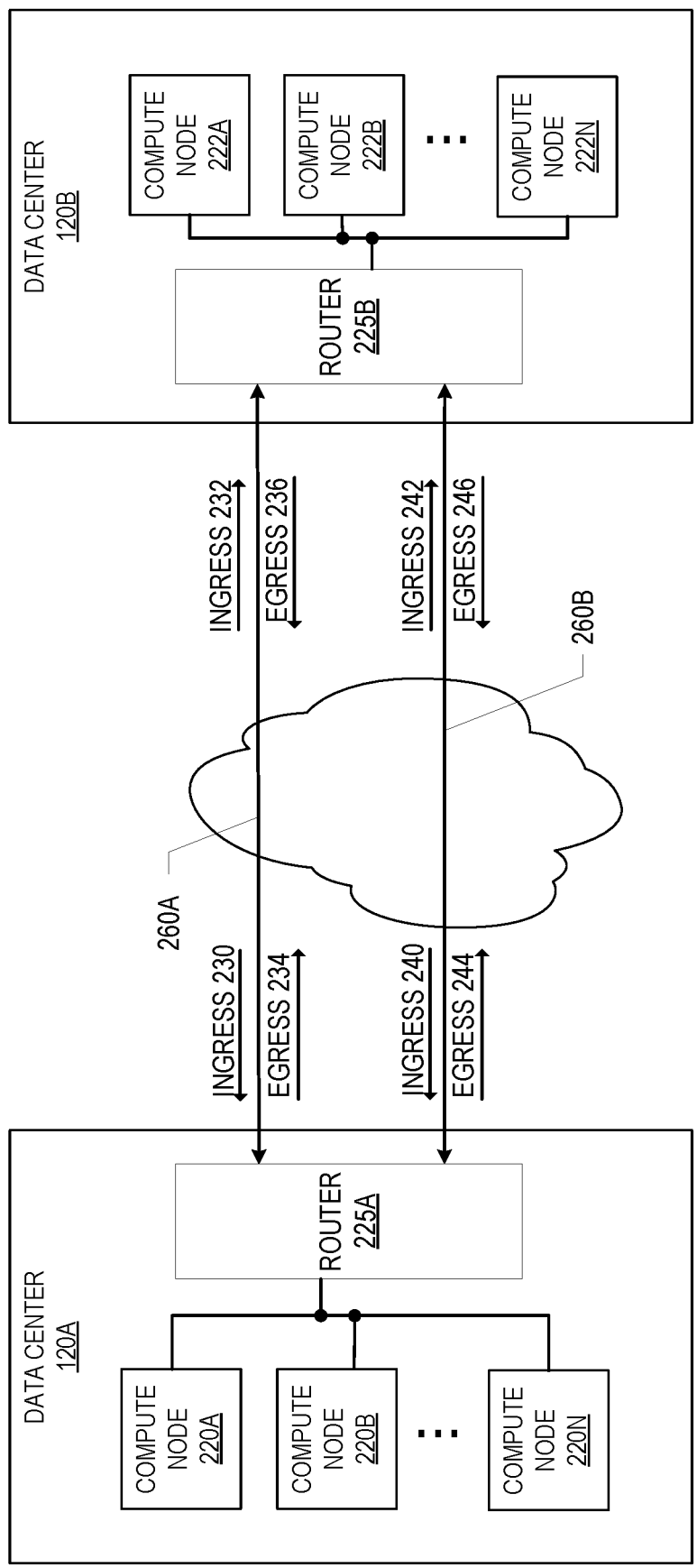
FIG. 2 illustrates exemplary data centers and their transit connections according to an embodiment.

There may be multiple transit connections between the data centers. FIG. 2 illustrates an exemplary data center 120A and data center 120B and their transit connections according to an embodiment. The data center 120A includes the compute nodes 220A-N and the data center 120B includes the compute nodes 222A-N. The compute nodes 220A-N are coupled to the router 225A and the compute nodes 222A-N are coupled to the router 225B. Each of the compute nodes 220A and 222A may be physical servers. A first transit connection 260A and a different second transit connection 260B connect the data centers 120A and 120B. The transit connections 260A and 260B may be provided by different network providers and may have different properties (e.g., different performance characteristics such as latency, speed, and/or reliability; and cost).

When determining the optimal route, the characteristics of the transit connections may be considered. In an embodiment, each combination of transit connections between the data centers is tested for performance. For each transit connection between a first data center and a second data center, four variables may be tested including: ingress to the first data center, ingress to the second data center, egress from the first data center, and egress from the second data center. The performance of the entry and exist transit connections may not be the same. For instance, as illustrated in FIG. 2, the following may be tested and measured for the transit connection 260A: the ingress 230 into the data center 120A, the ingress 232 into the data center 120B, the egress 234 from the data center 120A, and the egress 236 from the data center 120B. Likewise, the following may be tested and measured for the transit connection 260B: the ingress 240 into the data center 120A, the ingress 242 into the data center 120B, the egress 244 from the data center 120A, and the egress 246 from the data center 120B.

The transit connections may be tested using network probes. The network probe data may include probe data for data center-to-data center links and/or probe data for data center-to-origin links. The probe data for data center-to-data center links and the probe data for data center-to-origin links may determine (at a particular time) for each link, the network average round trip time (RTT), the network minimum RTT, the network maximum RTT, the network median RTT, the network standard deviation, jitter metrics on network RTT, packet loss rate, throughput, IP path MTU, AS path (including number of ASes in the path and which specific ASes are in the path), packet reordering, and/or packet duplication for each of the transit connections. The network probe data is used to calculate forwarding tables that provide the optimized routes.

A unique IP routing prefix may be assigned to each network link and each prefix may be advertised to only one network link. Each compute node is assigned multiple IP addresses, at least one from each prefix. In an embodiment, the optimized routes use encoded IP address(es) to direct traffic between the compute nodes. These transit selection IP addresses define the endpoints (e.g., source and destination compute nodes) and the transit providers that are to be used to move traffic. Each compute node is configured with at least a first set of transit selection IP addresses for each transit provider. By way of example, a transit selection IP address is an IPv6 address and may take the form of 2001:dB80:DDDI:EMMM::1, where DDD is a value that identifies the data center (a data center identifier), I is a value that identifies the ingress transit provider (0 is reserved for default behavior), E is a value that identifies the egress transit provider (0 is reserved for default behavior), and MMM is a value that identifies that compute node (0 is reserved for equal-cost multi-path (ECMP) groups). The order of the values that encode the information may be different in different embodiments. By way of example, in the example shown in FIG. 2, there are two transit providers. Assuming that the data center 120A is identified by the value 230 (0xa00+0xe6=0xae6), the compute node 220A is identified by the value 125 (0x7d), and if the default value is included, there will be three ingress indexes and three egress indexes. Accordingly, 9 transit selection IP addresses are assigned for the compute node 220A as follows:

(1) 2001:dB80:ae60:007d::1 (data center 230, compute node 125, 0 ingress, 0 egress);
(2) 2001:dB80:ae60:107d::1 (data center 230, compute node 125, 0 ingress, 1 egress);
(3) 2001:dB80:ae60:207d::1 (data center 230, compute node 125, 0 ingress, 2 egress);
(4) 2001:dB80:ae61:007d::1 (data center 230, compute node 125, 1 ingress, 0 egress);
(5) 2001:dB80:ae61:107d::1 (data center 230, compute node 125, 1 ingress, 1 egress);
(6) 2001:dB80:ae61:207d::1 (data center 230, compute node 125, 1 ingress, 2 egress);
(7) 2001:dB80:ae62:007d::1 (data center 230, compute node 125, 2 ingress, 0 egress);
(8) 2001:dB80:ae62:107d::1 (data center 230, compute node 125, 2 ingress, 1 egress); and
(9) 2001:dB80:ae62:207d::1 (data center 230, compute node 125, 2 ingress, 2 egress).

A second set of transit selection IP addresses may be assigned to each compute node where the identifier for the compute node is set to 0 to form ECMP groups. Thus, these transit selection IP addresses may take the form of 2001:dB80:DDDI:EMMM::1 where MMM is 0. The second set of transit selection IP addresses are not used as source addresses (e.g., due to the difficulty of ensuring return packets are directed to the correct compute node of the ECMP group). However, the second set of transit selection IP addresses may be used as destination addresses. By using two sets of addresses, the only compute node identifier required to setup the connection is the compute node identifier of the compute node that is opening the connection (which is used to bind to a specific local source address).

The set(s) of transit selection IP addresses for a compute node are configured on the local loop-back interface of the compute node. The set(s) of transit selection IP addresses for a compute node are advertised to the edge router of the data center. For instance, the compute nodes 220A-N each advertise their assigned set(s) of transit selection IP addresses to the router 225A, and the compute nodes 222A-N each advertise their assigned set(s) of transit selection IP addresses to the router 225B.

The routers of the data centers are configured to accept the advertisements. For instance, the router 225A is configured to accept the advertisements of the set(s) of transit selection IP addresses of the compute nodes 220A-N, and the router 225B is configured to accept the advertisements of the set(s) of transit selection IP addresses of the compute nodes 222A-N. Each router 225 is also configured to advertise specific ingress BGP prefixes to specific transit providers (and only those transit providers) to force traffic to be received through those specific providers. For instance, the router 225A is configured to advertise the transit selection IP address prefix for the transit provider identified by the ingress index 1 only to the transit provider identified by the ingress index 1. To advertise specific transit selection IP address prefixes only to specific transit providers, each router 225 is configured to match the transit selection IP address prefix (e.g., the value that identifies the ingress transit provider) to the corresponding transit providers and their physical interfaces on the router 225 and advertise accordingly. For instance, the router 225A is configured to match the transit selection IP address prefix for the transit provider identified by the ingress index 1 to the physical interface on the router 225A for that transit provider identified by the ingress index. With respect to FIG. 2, if the first transit connection 260A is provided by a transit provider identified by the ingress index 1, the router 225A is configured to match the transit selection IP address prefix that encodes the ingress index 1 to the physical interface on the router 225A for the first transit connection 260A and advertise the transit selection IP address prefixes that include the ingress index 1 only to the transit provider identified by the ingress index 1.

To support egress to a specific transit provider, each router 225 is configured with one or more route filters to direct traffic out of specific physical interfaces. For instance, each router 225 is configured to match the transit selection IP address prefix (e.g., the value that identifies the egress transit provider) to the corresponding transit providers and their physical interfaces on the router 225. For instance, each router 225 may be configured to recognize that the source IP address of a packet is a transit selection IP address that encodes an egress transit provider, match that encoding to the physical interface configured for that transit provider, and direct the packet out that physical interface.

As an example, for a packet from a service running in the compute node 220A going to a service running in a compute node of the data center 120B, the source transit selection IP address controls egress transit out of the data center 120A and the destination transit selection IP address controls ingress transit into the data center 120B.

Because the transit selection IP addresses are specially encoded to instruct the routers how traffic should be handled (and the routers exhibit specific traffic routing behavior depending on the encoding), the transit selection IP addresses do not act like traditional IP addresses. Connections that utilize transit selection IP addresses are subject to pre-determined behaviors by the existing networking infrastructure (e.g., the routers). This effectively overrides the routes of a conventional routing table (e.g., generated by BGP).

Although embodiments have described using an IP address to encode how traffic is to be routed, other embodiments encode the routing policy differently. In another embodiment, the Differentiated Services Code Point (DSCP) bits in the header of the IP packet may be used to encode an egress transit connection. In another embodiment, at layer 3, different VLANs between the host (e.g., compute node) and router are used to signal which traffic goes to which egress transit connection. In another embodiment, an identification of the egress transit connection is encoded using a layer 2 source or destination MAC address. Regardless of the embodiment, the sending host (e.g., the compute node) is capable of tagging or otherwise marking the outbound traffic in a way that causes the router to force that traffic to egress on a specific transit connection.

Figure 3:
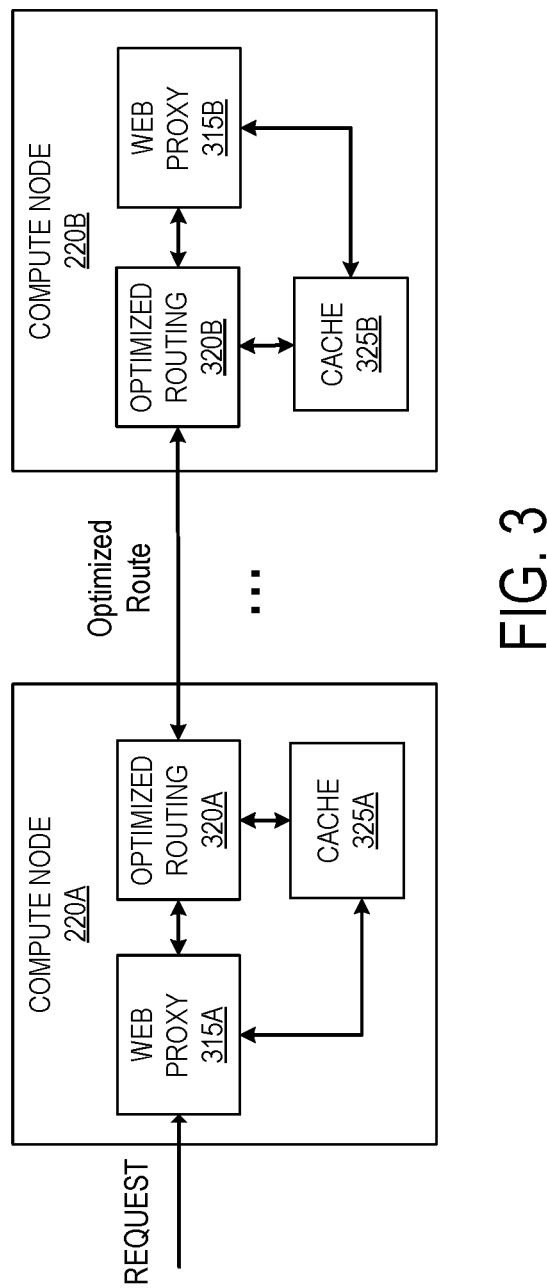
FIG. 3 illustrates an exemplary architecture of a compute node according to an embodiment.

FIG. 3 illustrates an exemplary architecture of a compute node according to an embodiment. The compute node 220A includes a web proxy 315A, an optimized routing module 320A, and a cache 325A. The web proxy 315A receives requests (e.g., HTTP/S requests), such as from the client device 110. The web proxy 315A may determine whether the request can be fulfilled using resources in its cache 325A instead of, for example, querying the origin server or another compute node for the requested resource. Before determining to transmit the request to another server of the distributed cloud computing network 105 or to the origin server, the compute node 220A can determine whether the requested resource is available in cache, and if so, return the requested resource without querying the origin server or another server.

The optimized routing module 320A is configured to intelligently route at least certain requests towards their destination. The compute node 220A stores optimized routes that it can use to intelligently route requests towards their destination. Each optimized route may include one or more hops, one or more next-hops (e.g., which may be tried randomly for load balancing purposes), and/or one or more alternate paths to be tried if the first path fails. Each hop may be an IP address. If the request cannot be answered using its cache, the optimized routing module 320A accesses the stored optimized routes to determine if an optimized route exists (e.g., based on the destination of the request). The optimized routing module 320A attempts to connect to the best route as defined by the optimized route and if it cannot connect it tries an alternative route (if one exists).

As illustrated in FIG. 3, the optimized routing module 320A of the compute node 220A communicates with the optimized routing module 320B of the compute node 220B. The optimized routing modules may communicate using a layer-4 (e.g., TCP or UDP), mutually-authenticated TLS, point-to-point link. This allows any layer-4 traffic to be communicated between the compute nodes 220A and 220B. The compute node 220A may transmit a request to the compute node 220B (e.g., a similar request as received by the compute node 220A). The compute node 220B may determine whether the request can be fulfilled using resources in its cache 325B in a similar way as the compute node 220A. The web proxy 315B of the compute node 220B may be configured to connect to the origin if the origin is coupled to the compute node 220B.

In some instances, the compute node 220A may not intelligently route requests towards their destinations. For instance, the compute node 220A may determine that there is not sufficient information to intelligently route requests towards a particular destination (e.g., an optimized route does not exist). In such a case, the compute node 220A may proxy the request directly towards the destination origin (e.g., the origin server 130) over a non-optimized route (the default route according to BGP, for instance) through a public network such as the Internet.

Figure 4:
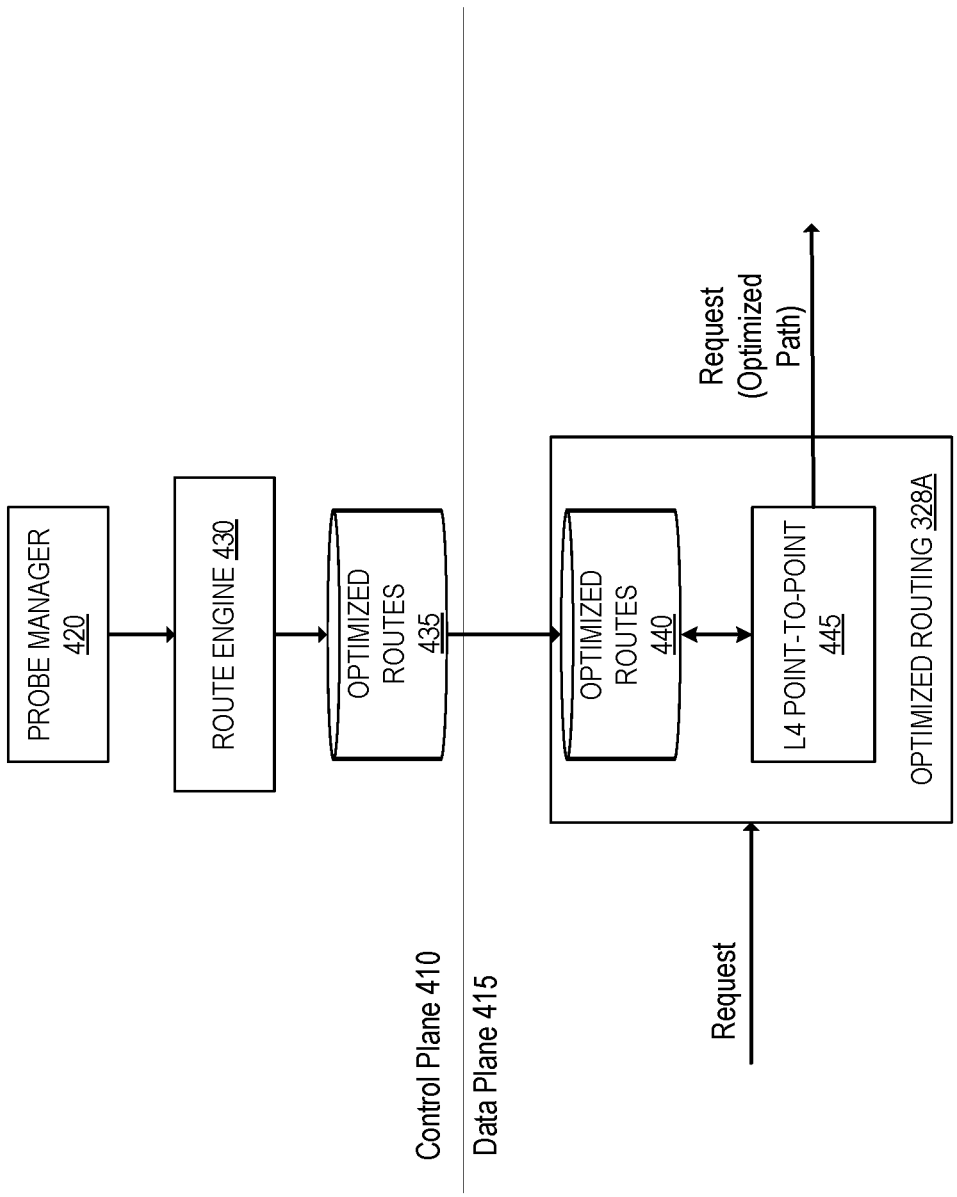
FIG. 4 illustrates an example architecture for determining and using optimized routes according to an embodiment.

FIG. 4 illustrates an example architecture for determining and using optimized routes according to an embodiment. The optimized routing is logically split into a control plane 410 and a data plane 415. The control plane 410 computes a routing table and stores the computed routes. The routing table is modified/re-computed periodically based on new probe data and/or feedback of real-time traffic performance. The data plane 415 executes the computed, optimized routes. Each optimized route may include one or more hops, one or more next-hops (e.g., which may be tried randomly for load balancing purposes), and/or one or more alternative paths to be tried if the first path fails.

The control plane 410 may be executed on a server separate from the data centers 120A-N (e.g., as part of a control server) or be part of each data center 120. The control plane 410 includes the probe manager 420. The probe manager 420 manages one or more probes such as a data center-to-data center probe and/or a data center-to-origin probe. The data center-to-data center probe determines, at a particular time, for each data center-to-data center link, the network average RTT, the network minimum RTT, the network maximum RTT, the network median RTT, the network standard deviation, jitter metrics on network RTT, packet loss rate, throughput, IP path MTU, AS path (including number of ASes in the path and which specific ASes are in the path), packet reordering, and/or packet duplication. The data center-to-origin probe determines, at a particular time, for each link, the networkRTT to the origin server, the network minimum RTT to the origin server, the network maximum RTT to the origin server, the network median RTT to the origin server, the network standard deviation to the origin server, jitter metrics on the network to the origin server, packet loss rate to the origin server, throughput to the origin server, IP path MTU to the origin server, AS path to the origin server, packet reordering to the origin server, and/or packet duplication to the origin server. In cases where the control plane 410 is implemented on a control server separate from the servers of the data centers 120A-N, the control server may transmit a probe request to each data center 120 to probe traffic to another data center or an origin. Each server of a data center 120 may perform a TCP traceroute according to the probe request and transmit the result back to the control server.

The route engine 430 uses the results of the probe(s) to compute optimized routes that are stored in the optimized routes 435. Each optimized route may include one or more hops, one or more next-hops (e.g., which may be tried randomly for load balancing purposes), and/or one or more alternative paths to be tried if the first path fails. In an embodiment, the optimized route may include an optimal primary transit selection path, an optimal non-transit selection path as a first failover path, and a second failover path of direct-to-origin.

At least a portion of the optimized routes are communicated to the data plane 415 as optimized routes 440. The optimized routes 440 are used by the optimized routing module 328A (for example) when intelligently routing requests toward their origin. The optimized routing module 328A also includes the L4 point-to-point module 445 that is operative to establish a mutually-authenticated TLS point-to-point link with another edge server in which the request is transited. In an embodiment, HTTP Connect is used in connection between the edge servers. For instance, the L4 point-to-point module may act as an HTTP Connect proxy and execute the HTTP Connect protocol as defined in RFC 2616.

Figure 5:
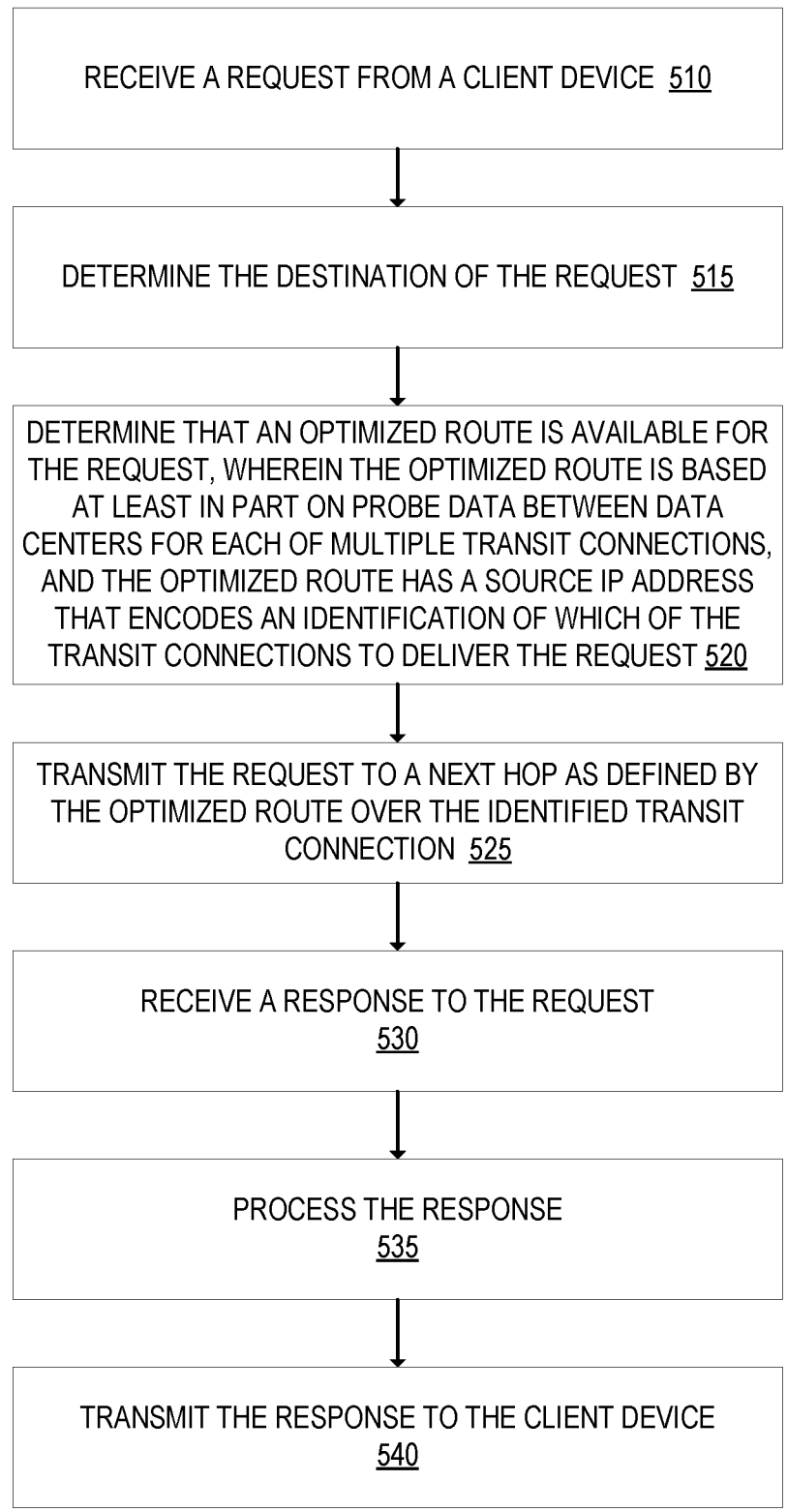
FIG. 5 is a flow diagram that illustrates exemplary operations for intelligently routing internet traffic according to an embodiment.

FIG. 5 is a flow diagram that illustrates exemplary operations for intelligently routing internet traffic according to an embodiment. The operations of FIG. 5 are described with reference to the exemplary embodiment of FIG. 2. However, the operations of FIG. 5 can be performed by embodiments other than those discussed with reference to FIG. 2, and the embodiments discussed with reference to FIG. 2 can perform operations different than those discussed with reference to FIG. 5.

At operation 510, a compute node 220A receives data from the client device 110. The data may be a request such as an HTTP/S request or other Internet request or other Internet data. The following description of FIG. 5 will be with the example that the data is a request. The compute node 220A may receive the request because it is in the closest data center to the client device (out of the data centers 120A-N) in terms of routing protocol configuration (e.g., BGP configuration) according to an anycast implementation.

Next, at operation 515, the compute node 220A determines the destination of the request. The destination may be specified in the request. The routing of the request may be different depending on the destination of the request.

Next, at operation 520, the compute node 220A determines that an optimized route for transmitting the request towards an origin server corresponding with the destination of the request is available. Determining that an optimized route is available may include accessing a storage of optimized routes that are computed by a control plane like the control plane 410. The optimized routes may be based in part on probe data between the data centers 120A-N for each of multiple transit connections and/or probe data between the data centers 120A-N and the destination. The optimized routes may be stored according to a pair defined by the receiving data center (e.g., the data center 120A in this case) and the subnet of the origin server (the subnet of the destination).

The optimized route uses one or more encoded IP addresses that specify the transit provider(s) that are to be used to deliver the traffic. For instance, the optimized route has a source IP address that encodes an identification of which of the transit connections are to deliver the request. For instance, the source IP address may encode an identification of the egress transit connection on which the request is to egress the data center 120A. The source IP address may further encode: an identifier of the source data center (e.g., the data center 120A), and/or an identification of the ingress transit connection on which a response is to be received at the data center 120A. The source IP address may also identify the source compute node. The optimized route may have a destination IP address that encodes: an identification of the destination data center (e.g., the data center 120B), an identification of the ingress transit connection into the destination data center, an identification of the egress transit connection out of the destination data center, and/or an identification of the destination compute node.

In an embodiment, prior to performing operation 520, the compute node 220A may determine whether the request can be fulfilled with its cache (e.g., whether the requested resource is available in its cache). If it can, then operation 520 may not be performed and the compute node 220A may respond to the request locally. If it cannot, then operation 520 is performed in an embodiment.

Next, at operation 525, the compute node 220A transmits the request to a next hop over the identified transit connection as defined by the optimized route. If the next hop is another data center 120, the compute node 220A may transmit the request to another compute node in a different data center using a layer-4 point-to-point link that is a mutually authenticated TLS connection. Prior to transmitting the request, the compute node 220A may add metadata to the request that specifies the destination and the optimized route(s). For instance, a header may be added that specifies the IP address and port of the destination, a header may be added that specifies the request URI, a header may be added that specifies how the request is routed, and optionally a header may be added that specifies that the request is delivered to the origin via a specific compute node. In an embodiment, the optimized route(s) are defined by a one or more path components where each path component has one or more next hop bags, where each next hop bag has one or more next hops, and each next hop is an IP address and port or a literal string of the origin.

In an embodiment, the compute nodes do not directly connect to the transit connections. Instead, a router (or other piece of networking equipment) couple the compute nodes with the transit connections. In such an embodiment, the router of the source data center (e.g., the router 225A) receives the request from the compute node 220A, and is configured to recognize the transit selection IP addresses and perform specific traffic routing behavior depending on the encoding of the transit selection IP addresses. For instance, if the source IP address is encoded with an identifier of the egress transit connection, the router 225A is configured to recognize and match that encoding to the corresponding transit connection and its physical interface to direct the traffic onto the identified transit connection.

The request may transit through one or more other data centers 120 of the distributed cloud computing network 105 until either the request can be locally fulfilled (e.g., using a locally available cache) or until the request is transmitted to the origin server. After exiting the data center 120A, the request may travel through one or more other network equipment before being received by the next hop (e.g., the data center 120B). The next hop, assuming that it is not the origin, receives the request based on the transit connection according to the transit selection IP address. A response to the request may be transmitted along the same path as the request.

Next, at operation 530, the compute node 220A receives a response to the request. The response is received on the transit connection according to the transit selection IP address. At operation 535 the compute node 220A processes the response. Processing the response may include adding the response to its cache as appropriate. Next, at operation 540, the response is transmitted to the client device 110.

Figure 6:
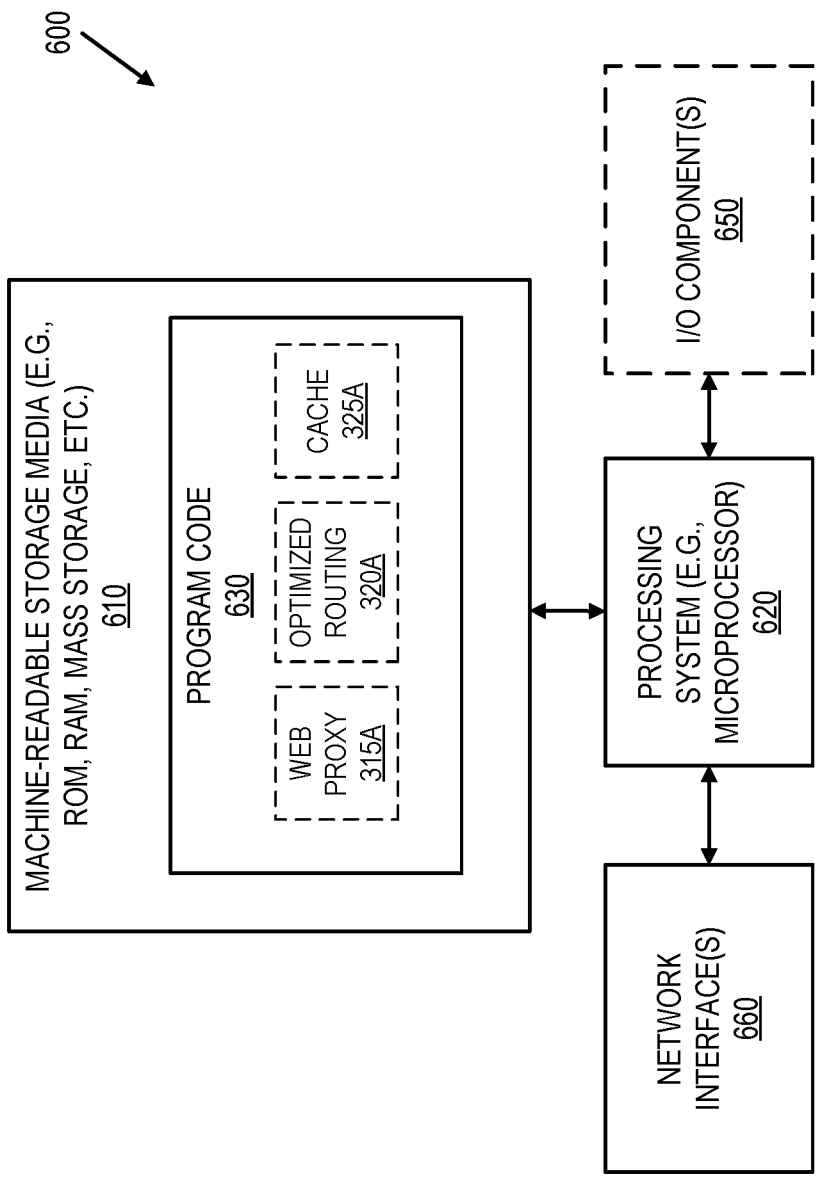
FIG. 6 is a block diagram illustrating a data processing system that can be used in an embodiment.

FIG. 6 illustrates a block diagram for an exemplary data processing system 600 that may be used in some embodiments. One or more such data processing systems 600 may be used to implement the embodiments and operations described with respect to the compute nodes or other electronic devices. The data processing system 600 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 620 (e.g., one or more processors and connected system components such as multiple connected chips). For example, the depicted machine-readable storage media 610 may store program code 630 that, when executed by the processor(s) 620, causes the data processing system 600 to execute the web proxy 315A, the optimized routing module 320A, the cache module 325A, and/or any of the operations described herein.

The data processing system 600 also includes one or more network interfaces 660 (e.g., a wired and/or wireless interfaces) that allows the data processing system 600 to transmit data and receive data from other computing devices, typically across one or more networks (e.g., Local Area Networks (LANs), the Internet, etc.). The data processing system 600 may also include one or more input or output ("I/O") components 650 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 600, and, in certain embodiments, fewer components than that shown in One or more buses may be used to interconnect the various components shown in FIG. 6.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
    receiving a request from a client device at a first one of a plurality of compute nodes at a first one of a plurality of data centers of a distributed cloud computing network;
    determining a destination of the request;
    determining an optimized route for transmitting the request toward an origin server that corresponds with the destination of the request, wherein the optimized route is based at least in part on probe data between data centers of the distributed cloud computing network for a plurality of transit connections, wherein the optimized route has an IP address that includes a first portion that encodes an identification of which of the plurality of transit connections is to be used to deliver the request, a second portion that encodes an identification of a data center, and a third portion that encodes an identifier for an ingress transit connection from the plurality of transit connections; and
    transmitting the request to a next hop as defined by the optimized route over the identified one of the plurality of transit connections.

2. The method of claim 1, wherein the IP address that encodes the identification of which of the plurality of transit connections is to be used to deliver the request is a source IP address.

3. The method of claim 1, wherein the IP address that encodes the identification of which of the plurality of transit connections is to be used to deliver the request is a source IP address, and wherein the source IP address further includes a fourth portion that encodes an identification of an egress transit connection from the plurality of transit connections.

4. The method of claim 1, wherein the next hop is a second one of the plurality of data centers, and wherein the optimized route has a destination IP address that includes a first portion that encodes an identification of which of the plurality of transit connections is to be used for ingress to the second one of the plurality of data centers, and a second portion that encodes an identifier of the second one of the plurality of data centers.

5. The method of claim 1, wherein transmitting the request to the next hop includes a router of the first data center matching the encoded identification of which of the plurality of transit connections is to be used to deliver the request with a physical interface on the router and transmitting the request using that physical interface.

6. The method of claim 1, further comprising:
    receiving a response to the transmitted request; and
    transmitting the response to the client device.

7. The method of claim 1, wherein the optimized route is further based in part on probe data between the plurality of data centers and the origin server.

8. A non-transitory machine-readable storage medium that provides instructions that, when executed by a processor, causes the processor to perform the following operations:
    receiving a request from a client device at a first one of a plurality of compute nodes at a first one of a plurality of data centers of a distributed cloud computing network;
    determining a destination of the request;
    determining an optimized route for transmitting the request toward an origin server that corresponds with the destination of the request, wherein the optimized route is based at least in part on probe data between data centers of the distributed cloud computing network for a plurality of transit connections, wherein the optimized route has an IP address that includes a first portion that encodes an identification of which of the plurality of transit connections is to be used to deliver the request, a second portion that encodes an identification of a data center, and a third portion that encodes an identifier for an ingress transit connection from the plurality of transit connections; and transmitting the request to a next hop as defined by the optimized route over the identified one of the plurality of transit connections.

9. The non-transitory machine-readable storage medium of claim 8, wherein the IP address that encodes the identification of which of the plurality of transit connections is to be used to deliver the request is a source IP address.

10. The non-transitory machine-readable storage medium of claim 8, wherein the IP address that encodes the identification of which of the plurality of transit connections is to be used to deliver the request is a source IP address, and wherein the source IP address further includes a fourth portion that encodes an identification of an egress transit connection from the plurality of transit connections.

11. The non-transitory machine-readable storage medium of claim 8, wherein the next hop is a second one of the plurality of data centers, and wherein the optimized route has a destination IP address that includes a first portion that encodes an identification of which of the plurality of transit connections is to be used for ingress to the second one of the plurality of data centers, and a second portion that encodes an identifier of the second one of the plurality of data centers.

12. The non-transitory machine-readable storage medium of claim 8, wherein transmitting the request to the next hop includes a router of the first data center matching the encoded identification of which of the plurality of transit connections is to be used to deliver the request with a physical interface on the router and transmitting the request using that physical interface.

13. The non-transitory machine-readable storage medium of claim 8, the operations further comprising:
receiving a response to the transmitted request; and
transmitting the response to the client device.

14. The non-transitory machine-readable storage medium of claim 8, wherein the optimized route is further based in part on probe data between the plurality of data centers and the origin server.

15. An apparatus, comprising:
a processor; and
a non-transitory machine-readable storage medium that provides instructions that, when executed by a processor, causes the processor to perform the following:
receive a request from a client device at a first one of a plurality of compute nodes at a first one of a plurality of data centers of a distributed cloud computing network;
determine a destination of the request;
determine an optimized route for transmitting the request toward an origin server that corresponds with the destination of the request, wherein the optimized route is to based at least in part on probe data between data centers of the distributed cloud computing network for a plurality of transit connections, wherein the optimized route is have an IP address that includes a first portion that encodes an identification of which of the plurality of transit connections is to be used to deliver the request, a second portion that encodes an identification of a data center, and a third portion that encodes an identifier for an ingress transit connection from the plurality of transit connections; and
transmit the request to a next hop as defined by the optimized route over the identified one of the plurality of transit connections.

16. The apparatus of claim 15, wherein the IP address that encodes the identification of which of the plurality of transit connections is to be used to deliver the request is a source IP address.

17. The apparatus of claim 15, wherein the IP address that encodes the identification of which of the plurality of transit connections is to be used to deliver the request is a source IP address, and wherein the source IP address further includes a fourth portion that encodes an identification of an egress transit connection from the plurality of transit connections.

18. The apparatus of claim 15, wherein the next hop is a second one of the plurality of data centers, and wherein the optimized route has a destination IP address that includes a first portion that encodes an identification of which of the plurality of transit connections is to be used for ingress to the second one of the plurality of data centers, and a second portion that encodes an identifier of the second one of the plurality of data centers.

19. The apparatus of claim 15, wherein transmission of the request to the next hop includes a router of the first data center matching the encoded identification of which of the plurality of transit connections is to be used to deliver the request with a physical interface on the router and transmitting the request using that physical interface.

20. The apparatus of claim 15, wherein the non-transitory machine-readable storage medium further provides instructions that, when executed by the processor, causes the processor to perform the following:
receive a response to the transmitted request; and
transmit the response to the client device.

21. The apparatus of claim 15, wherein the optimized route is further based in part on probe data between the plurality of data centers and the origin server.

* * * * *